US011679787B2

(12) United States Patent
Kim et al.

(10) Patent No.: US 11,679,787 B2
(45) Date of Patent: Jun. 20, 2023

(54) AUTONOMOUS DRIVING CONTROL METHOD AND DEVICE

(71) Applicants: HYUNDAI MOTOR COMPANY, Seoul (KR); KIA MOTORS CORPORATION, Seoul (KR)

(72) Inventors: Hee Kyung Kim, Seoul (KR); Jin Su Jeong, Suwon-si (KR); Jae Yong Jeon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 45 days.

(21) Appl. No.: 17/026,581

(22) Filed: Sep. 21, 2020

(65) Prior Publication Data

US 2021/0339774 A1    Nov. 4, 2021

(30) Foreign Application Priority Data

Apr. 29, 2020    (KR) .................. 10-2020-0052402

(51) Int. Cl.
*B60W 60/00*    (2020.01)
*B60W 30/12*    (2020.01)
(Continued)

(52) U.S. Cl.
CPC ........ *B60W 60/0059* (2020.02); *B60W 30/12* (2013.01); *B60W 30/143* (2013.01);
(Continued)

(58) Field of Classification Search
None
See application file for complete search history.

(56) References Cited

U.S. PATENT DOCUMENTS 6,311,122 B1    10/2001  Higashimata
9,238,407 B1 *   1/2016  Brito ............... B60W 30/14
(Continued)

FOREIGN PATENT DOCUMENTS

DE    102011086241 B4 *  4/2018  ........... B60K 28/066
EP        3 552 907 A2    10/2019
JP       2007-245771 A1    9/2007

OTHER PUBLICATIONS

Dan Edmunds, Do Stop-Start Systems Really Save Fuel?, Nov. 30, 2014, edmunds (Year: 2014).*

(Continued)

*Primary Examiner* — James J Lee
*Assistant Examiner* — Andrew Sang Kim
(74) *Attorney, Agent, or Firm* — Lempia Summerfield Katz LLC

(57) ABSTRACT

A method for controlling autonomous driving in an autonomous vehicle includes detecting an autonomous driving-related critical situation during the autonomous driving, outputting a notification message requesting a control-right handover from an autonomous driving system to a human driver when the autonomous driving-related critical situation is detected, and activating a minimal risk maneuver (MRM) driving mode to deactivate the autonomous driving system when the control-right handover is not successful. In particular, when the minimal risk maneuver (MRM) driving mode is activated, the deactivated state of the autonomous driving system is maintained until an engine-restart of the autonomous vehicle is detected.

10 Claims, 5 Drawing Sheets

(51) Int. Cl.
*B60W 30/14* (2006.01)
*B60W 50/14* (2020.01)
*F02N 11/08* (2006.01)

(52) U.S. Cl.
CPC ........ *B60W 50/14* (2013.01); *B60W 60/0053* (2020.02); *F02N 11/0811* (2013.01); *F02N 11/0818* (2013.01)

(56) References Cited

U.S. PATENT DOCUMENTS

| | | | |
|---|---|---|---|
| 2015/0120124 A1 | 4/2015 | Bartels et al. | |
| 2016/0107644 A1* | 4/2016 | Eigel | B60W 30/146 701/70 |
| 2017/0232973 A1* | 8/2017 | Otake | B60W 50/14 701/43 |
| 2019/0054928 A1* | 2/2019 | Hatano | B60W 60/0057 |
| 2020/0180661 A1* | 6/2020 | Honda | B60W 50/14 |

OTHER PUBLICATIONS

Neal E. Boudette, Elon Musk Says Pending Tesla Updates Could Have Prevented Fatal Crash, Sep. 11, 2016, The New York Times (Year: 2016).*
European Search Report dated Mar. 9, 2021 in corresponding Application EP20196440, 9 pages.

* cited by examiner

AUTONOMOUS DRIVING CONTROL METHOD AND DEVICE

CROSS-REFERENCE TO RELATED APPLICATION

This application claims priority to and the benefit of Korean Patent Application No. 10-2020-0052402, filed on Apr. 29, 2020, the entire contents of which are incorporated herein by reference.

FIELD

The present disclosure relates to a method for controlling autonomous driving.

BACKGROUND

The statements in this section merely provide background information related to the present disclosure and may not constitute prior art.

An autonomous vehicle requires an ability to adaptively cope with a surrounding situation changing in real time while the vehicle is driving.

For production and popularity of the autonomous vehicle, it is important to impart a reliable Fail/Safe function to the vehicle.

That is, the function is about how the vehicle will cope with a moment when the autonomous vehicle fails or an autonomous function does not operate normally.

An autonomous driving system of a level 2 which is currently being produced may provide a very simple Fail/Safe function.

In an example of a recently released highway driving assist function, when a state in which a line is not recognized continues for a certain period of time when an autonomous driving function is performed, the vehicle informs a human driver that the autonomous driving system is abnormal using visual and audible alarms and automatically deactivates the autonomous driving system.

That is, the vehicle handovers a control-right to the human driver, such that the human driver entirely deals with a future situation.

However, we have found that when the autonomous driving system is automatically turned off, there is a situation where the human driver does not recognize the turn off of the autonomous driving system.

In a current policy of each country, for production of the autonomous vehicle, a government recommends that a manufacturer adds a minimum risk maneuver (MRM) function to the vehicle.

In particular, because in an autonomous driving level 4 a final control responsibility is on the vehicle, a fail/safe strategy taken when a sensor and an actuator fail becomes a very important issue.

SUMMARY

The present disclosure has been made to solve the above-mentioned problems occurring in the prior art while advantages achieved by the prior art are maintained intact.

An aspect of the present disclosure provides a method and a device for controlling autonomous driving.

Another aspect of the present disclosure provides a method and a device for controlling autonomous driving when an autonomous vehicle operates in a minimal risk maneuver (MRM) driving mode upon detection of a critical situation.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a method for controlling autonomous driving in an autonomous vehicle includes: detecting, by a critical situation detector, an autonomous driving-related critical situation during the autonomous driving; outputting, by a control-right handover requester, a notification message requesting a control-right handover from an autonomous driving system to a human driver when the autonomous driving-related critical situation is detected; and activating, by a minimal risk maneuver (MRM) determiner, a minimal risk maneuver (MRM) driving mode to deactivate the autonomous driving system when the control-right handover is not successful. In particular, when the minimal risk maneuver (MRM) driving mode is activated, the deactivated state of the autonomous driving system is maintained until an engine-restart of the autonomous vehicle is detected.

In one form, the method may further comprise: operating, by a timer driver, a first timer and a second time when the critical situation is detected, wherein an operation time of the second timer may be larger than an operation time of the first timer, and wherein acceleration of the autonomous vehicle may be deactivated during the operation time of the first timer.

In one form, when the first timer expires, the minimal risk maneuver (MRM) driving mode may be activated and deceleration control may be carried out until the autonomous vehicle is stopped.

In one form, the deceleration control may be performed during the operation time of the second timer.

In one form, when the second timer expires, a driver assisting function may be deactivated until the engine-restart is detected, wherein the driver assisting function may include at least one of a smart cruise control (SCC) function, a lane following assist (LFA) function, a highway driving assist (HAD) function, or a lane keeping assist (LKA) function.

In one form, when the driver assisting function is deactivated, an ISG (Idle Stop & Go) function may be available.

In one form, a current driving lane of the autonomous vehicle may be maintained during the deceleration control.

In one form, after the minimal risk maneuver (MRM) driving mode is activated, the outputting state of the notification message may be maintained until the control-right handover has been completed.

In one form, when the control-right handover from the system to the human driver has been completed before at least one of the first timer or the second timer expires, the outputting of the notification message may be stopped, and the autonomous driving system may be deactivated.

In one form, the autonomous driving-related critical situation may include a situation in which the autonomous driving system deviates from a predefined operation region such that a normal operation of the autonomous driving system is impossible.

According to another aspect of the present disclosure, an autonomous driving controller includes: a critical situation detector for detecting an autonomous driving-related critical situation during autonomous driving, a control-right handover requester for outputting a notification message requesting a control-right handover from an autonomous driving system to a human driver when the autonomous driving-related critical situation is detected, a minimal risk maneuver (MRM) determiner for determining whether to activate a minimal risk maneuver (MRM) driving mode, based on whether the control-right handover is successful, and a processor that deactivates the autonomous driving system when the minimal risk maneuver (MRM) driving mode is activated, wherein when the minimal risk maneuver (MRM) driving mode is activated, the processor maintains the deactivated state of the autonomous driving system until an engine-restart of an autonomous vehicle is detected.

In one form, the autonomous driving controller may further include a timer driver for operating a first timer and a second time when the critical situation is detected, and a speed controller for controlling a speed of the vehicle, wherein an operation time of the second timer may be larger than an operation time of the first timer, wherein the processor may control the speed controller to deactivate acceleration of the autonomous vehicle during the operation time of the first timer.

In one form, when the first timer expires, and thus the minimal risk maneuver (MRM) driving mode is activated, the processor may control the speed controller to perform deceleration control until the autonomous vehicle is stopped.

In one form, the deceleration control may be performed during the operation time of the second timer.

In one form, when the second timer expires, the processor may send a predefined control signal to a driver assisting system controller to deactivate a driver assisting function until the engine-restart is detected.

In one form, the driver assisting function may include at least one of a smart cruise control (SCC) function, a lane following assist (LFA) function, a highway driving assist (HAD) function, or a lane keeping assist (LKA) function.

In one form, when the driver assisting function is deactivated, an ISG (Idle Stop & Go) function may be available.

In one form, the processor may maintain a current driving lane of the autonomous vehicle during the deceleration control.

In one form, after the minimal risk maneuver (MRM) driving mode is activated, the processor may maintain the outputting state of the notification message until the control-right handover has been completed.

In one form, when the control-right handover from the system to the human driver has been completed before at least one of the first timer or the second timer expires, the processor may stop the outputting of the notification message and to deactivate the autonomous driving system.

In one form, the autonomous driving-related critical situation may include a situation in which the autonomous driving system deviates from a predefined operation region such that a normal operation of the autonomous driving system is impossible.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
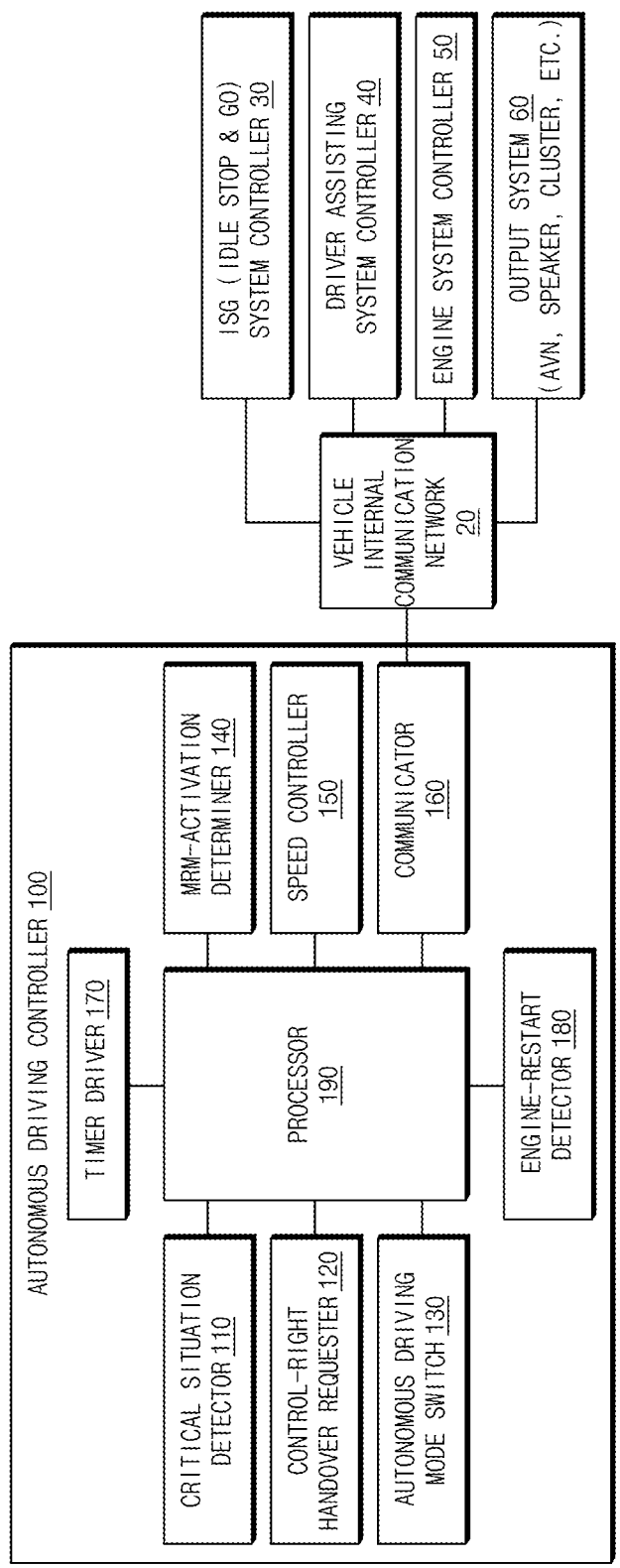
FIG. 1 is a block diagram illustrating a structure of an autonomous vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. It should be noted that in adding reference numerals to components of the drawings, the same or equivalent components are designated by the same numeral even when they are present on different drawings. Further, in describing an exemplary form of the present disclosure, a detailed description of a related known component or function will be omitted when it is determined that the description interferes with understanding of the form of the present disclosure.

In describing components of an form according to the present disclosure, terms such as first, second, A, B, (a), (b), and the like may be used. These terms are merely intended to distinguish between the components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to FIG. 1 to FIG. 5, exemplary forms of the present disclosure will be described in detail.

FIG. 1 is a block diagram illustrating a structure of an autonomous vehicle according to one form of the present disclosure.

Referring to FIG. 1, an autonomous vehicle may largely include an autonomous driving controller 100, a vehicle internal communication network 20, an ISG (Idle Stop & Go) system controller 30, a driver assisting system controller 40, an engine system controller 50, and an output system 60.

The components of the autonomous vehicle are not necessarily essential components, and more or less components may be included therein.

The autonomous driving controller 100 may include a critical situation detector 110, a control-right handover requester 120, an autonomous driving mode switch 130, a MRM-activation determiner 140, and a speed controller 150, a communicator 160, a timer driver 170, an engine-restart detector 180, and a processor 190.

The critical situation detector 110 may determine whether the autonomous vehicle encounters a critical situation in which autonomous driving is no longer possible while an autonomous driving function is activated. In this connection, the autonomous driving-related critical situation refers to a situation in which a normal operation of an autonomous driving system is impossible. The critical situation detector 110 may detect the critical situation when the system deviates from a predefined operation region. For example, the critical situation detector 110 may determine the critical situation based on a high risk of accidents such as vehicle collision due to sudden deceleration of a front vehicle, interruption of another vehicle, or sudden lane change of a front vehicle. In another form, the critical situation detector 110 may determine, as the critical situation, a situation in which vehicle control is desired to switch from the system to a human driver. However, the present disclosure is not limited thereto.

When the autonomous driving-related critical situation is detected, the control-right handover requester 120 may create a control-right handover requesting message. At this time, the generated control-right handover requesting message may be output through the output system 60.

For example, the control-right handover requesting message may be a message requesting a control-right handover from the system to the human driver, and may be output through predetermined output means provided in the vehicle, for example, image output means such as a display, sound output means such as a speaker and a beeper, haptic means such as a vibration motor. However, the present disclosure is not limited thereto.

When the autonomous driving-related critical situation is detected, the timer driver 170 may drive first and second timers.

The MRM-activation determiner 140 may determine whether the control-right handover has been completed before the first timer expires. When the control-right handover from the system to the human driver has been completed normally before the first timer expires, the MRM-activation determiner 140 may control the autonomous driving mode switch 130 to convert the autonomous driving function to a deactivated state.

When the first timer expires, the MRM-activation determiner 140 may activate a minimal risk maneuver (MRM) mode for the autonomous vehicle.

The processor 190 may be configured to continuously output the control-right handover requesting message even after the minimal risk maneuver (MRM) mode is activated.

The processor 190 may determine whether the control-right handover has been completed before the second timer expires.

When the control-right handover from the system to the human driver has been normally completed before the second timer expires, the processor 190 may control the autonomous driving mode switch 130 to convert the autonomous driving function to a deactivated state.

When the second timer expires, the processor 190 may generate and output a predetermined message indicating that the autonomous driving function cannot be activated, and may send a driver assisting system deactivation requesting signal to the driver assisting system controller 40 through the vehicle internal communication network 20.

Subsequently, the processor 190 may transition the autonomous driving function from an activated state to a deactivated state (S470).

In this connection, the autonomous driving function deactivated state means a state in which the autonomous driving function cannot be activated.

The engine-restart detector 180 may determine whether an engine of the autonomous vehicle is restarted in a state in which the autonomous driving function is deactivated. In this connection, the engine-restart detector 180 may determine whether the engine of the vehicle is restarted based on an external control signal. For example, the engine-restart detector 180 may detect whether the engine of the vehicle is restarted based on a predetermined control signal received from the engine system controller 50 when the vehicle engine restarts.

When the engine-restart is detected, the processor 190 may change the autonomous driving function form the deactivated state to the activated state. Thus, the processor 190 may activate the autonomous driving function according to an external input, for example, when the human driver presses an autonomous driving function activation button.

In the form of FIG. 1, when the autonomous vehicle encounters the autonomous driving-related critical situation, the processor 190 may control the speed controller 150 to stop acceleration.

In the form of FIG. 1, when the autonomous vehicle operates in the minimal risk maneuver (MRM) mode, the processor 190 may allow the vehicle to be maintained in a current lane and control the speed controller 150 for deceleration. For example, the processor 190 may perform the deceleration control so that the vehicle stops within a predetermined time after the activation of the minimal risk maneuver (MRM) mode.

In the form of FIG. 1, when the autonomous vehicle operates in the minimal risk maneuver (MRM) mode, a sudden deceleration situation of a front vehicle, an interruption situation of another vehicle, or sudden appearance of an obstacle after sudden lane change of a front vehicle, etc. may be detected. However, when a lead time to cope with this situation is insufficient upon the detection thereof, emergency manipulation may be initiated for preventing collisions or alleviating an impact from the collision. In this connection, the emergency manipulation may include emergency braking manipulation, lane change manipulation, and the like. However, the present disclosure is not limited thereto. In this connection, the emergency manipulation may be automatically terminated when the human driver receives the control-right handover or the danger of the collision disappears.

Figure 2:
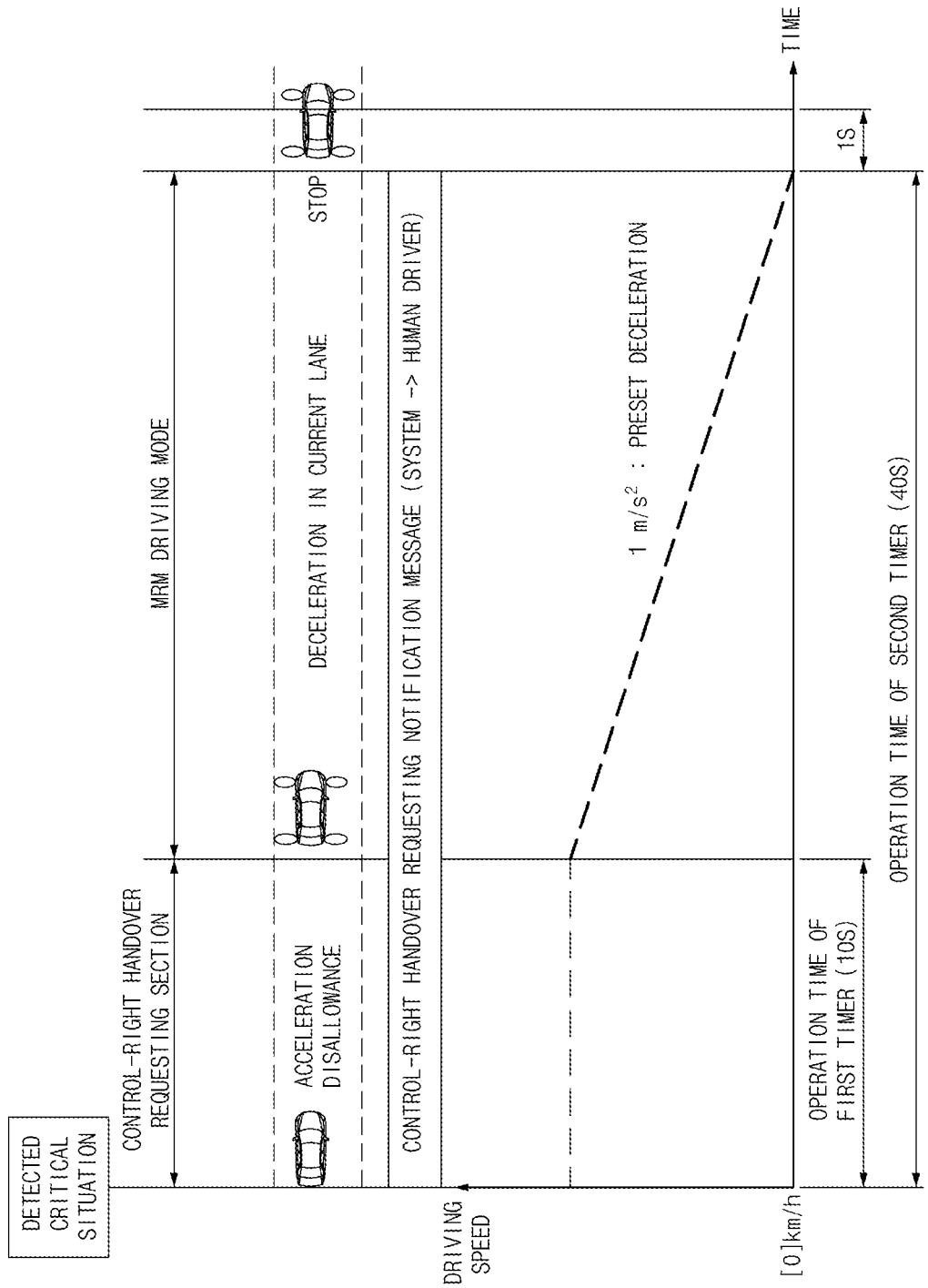
FIG. 2 is a view for illustrating an operating mechanism in an autonomous vehicle control-right handover notification and in a minimal risk maneuver (MRM) driving mode in one form of the present disclosure.

FIG. 2 is a view for illustrating an operation mechanism in the autonomous vehicle control-right handover notification and in the minimal risk maneuver (MRM) driving mode according to one form of the present disclosure.

Referring to FIG. 2, when the autonomous driving controller 100 detects the autonomous driving-related critical situation, the autonomous driving controller 100 may drive the first timer and the second timer, and may output the control-right handover requesting notification.

The autonomous driving controller 100 may disable acceleration of the vehicle and maintain the vehicle speed at a constant speed until the first timer expires after detecting the critical situation.

When the human driver receives the control-right handover before the first timer expires, the autonomous driving controller 100 may stop the outputting of the control-right handover requesting notification message, and the operations of the first and second timers may be terminated.

When the first timer has expired, the autonomous driving controller 100 may activate the minimal risk maneuver (MRM) driving mode.

When the vehicle is activated in the minimal risk maneuver (MRM) driving mode, the autonomous driving controller 100 may control the vehicle to be decelerated while a current driving lane is maintained.

When the control-right is handed over to the human driver before the second timer expires after the activation of the minimal risk maneuver (MRM) driving mode, the autonomous vehicle may stop outputting the control-right handover requesting notification message and may stop the operation of the second timer, and may deactivate the minimal risk maneuver (MRM) driving mode.

When the second timer expires, the autonomous vehicle may deactivate the driver assisting system.

Even when use of the autonomous driving system and the driver assisting system is disallowed after the activation of the minimal risk maneuver (MRM) driving mode, the autonomous driving controller 100 may allow use of the ISG system.

When the autonomous driving system and the driver assisting system are deactivated upon the activation of the minimal risk maneuver (MRM) driving mode, the autonomous vehicle may maintain the deactivated state thereof until the vehicle engine-restart is detected.

That is, when the vehicle engine-restart is detected, the autonomous vehicle may deactivate the minimal risk maneuver (MRM) driving mode and may operates in a normal mode.

In an example, an operation time of the first timer may be set to be smaller than an operation time of the second timer.

In another form, after the first timer expires, the autonomous driving controller 100 may perform linear deceleration control over time.

In an example, as shown in FIG. 2, in the minimal risk maneuver (MRM) driving mode, deceleration control at a deceleration of 1 m/s$^2$ may be performed, such that the autonomous vehicle stops within a maximum of 30 seconds.

Figure 3:
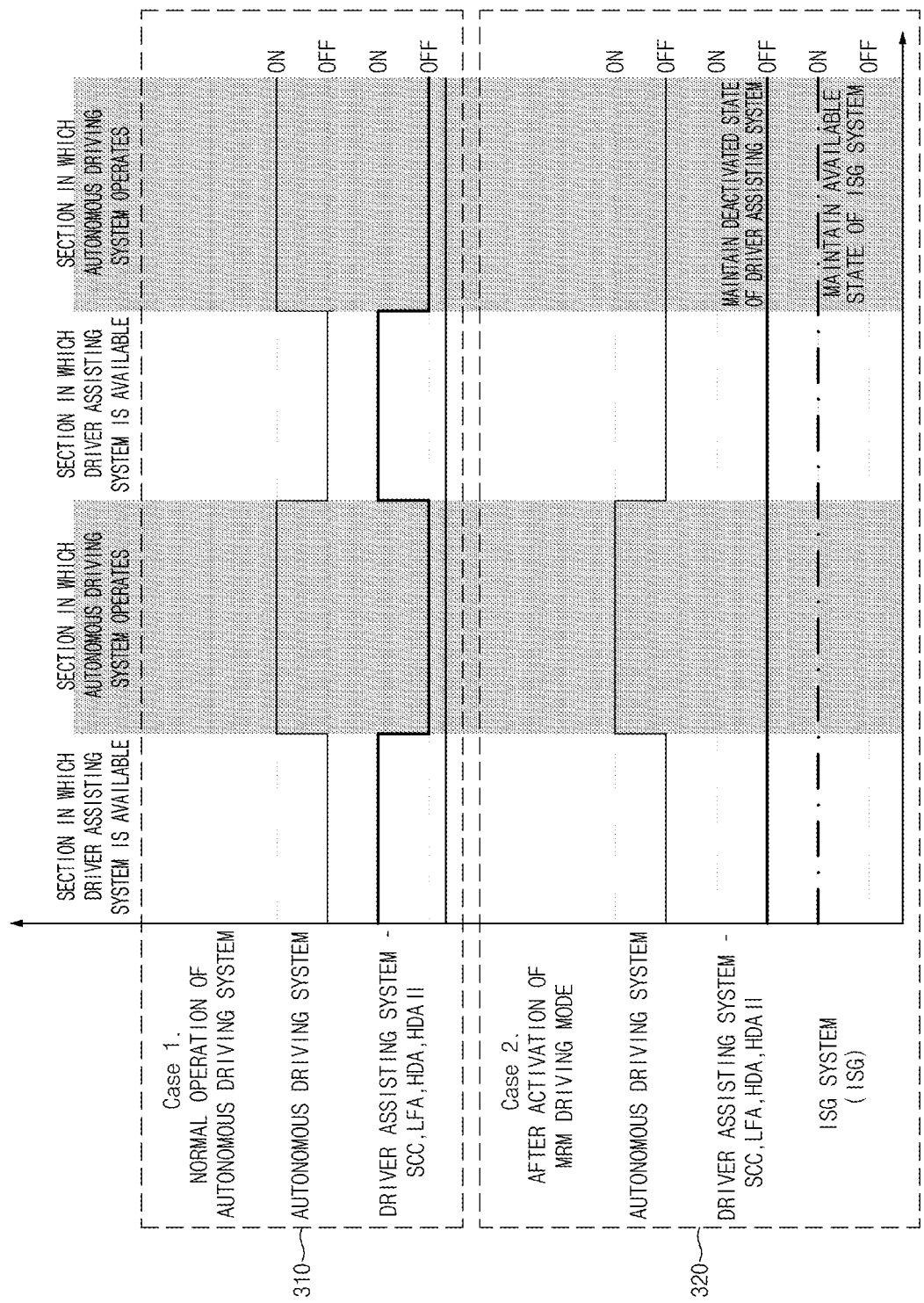
FIG. 3 is a view for illustrating an autonomous vehicle operation mechanism based on whether a minimal risk maneuver mode is activated in an exemplary form of the present disclosure.

FIG. 3 is a view for illustrating an autonomous vehicle operation mechanism based on whether the minimal risk maneuver mode is activated according to an exemplary form of the present disclosure.

Referring to a reference numeral 310, when a function of the autonomous driving system is activated in a state in which the autonomous driving system is in a normal operating state, that is, in a state in which the minimal risk maneuver mode is not activated, the use of the driver assisting system is disallowed. When the function of the autonomous driving system is disabled, the use of the driver assisting system may be normally allowed.

In an example, the state in which the autonomous driving system is operating normally may mean a state in which the driver can take over the control right normally and terminate the operation of the autonomous driving system in response to a request to transfer control. That is, the state in which the autonomous driving system is operating normally may mean a state in which the driver can end the use of the autonomous driving system through left and right operation of the steering wheel or operation of the autonomous driving system ON/OFF switch.

A reference numeral 320 shows an autonomous vehicle operation mechanism after operating in the minimal risk maneuver mode.

When the autonomous vehicle operates in the minimal risk maneuver mode, the autonomous driving function may be deactivated so that the autonomous driving system cannot be activated until the autonomous driving system is restarted upon the detection of the engine-restart of the vehicle.

When the autonomous vehicle operates in the minimal risk maneuver mode, the driver assisting function may be disabled so that the activation of the driver assisting system is impossible until the driver assisting system is restarted upon the detection of the engine-restart of the vehicle. This may be the same manner as in the autonomous driving system.

However, the autonomous vehicle may allow the activation of the ISG system even when the minimal risk maneuver mode is activated, regardless of the engine-restart condition which is applied the restart of the autonomous driving system or driver assisting system.

Figure 4:
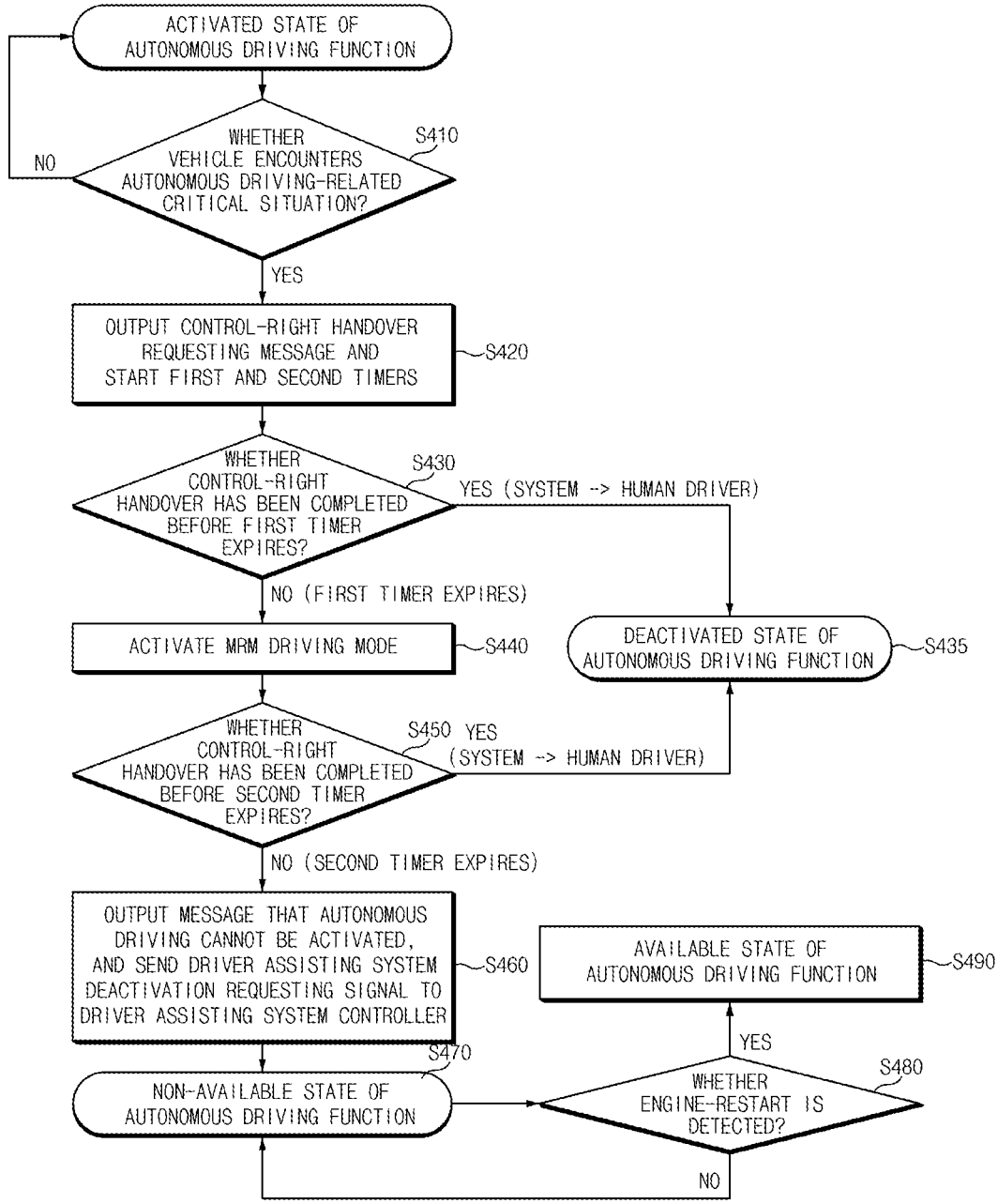
FIG. 4 is a flowchart for illustrating an autonomous vehicle control method according to one form of the present disclosure.

FIG. 4 is a flowchart for illustrating an autonomous vehicle control method in one form of the present disclosure.

In detail, FIG. 4 is a flowchart for illustrating an autonomous vehicle control method based on the minimal risk maneuver by the autonomous driving controller 100.

Referring to FIG. 4, the autonomous driving controller 100 may determine whether the vehicle encounters the autonomous driving-related critical situation in which autonomous driving is no longer possible while the autonomous driving function is activated (S410). In this connection, the autonomous driving-related critical situation refers to a situation in which a normal operation of an autonomous driving system is impossible. The autonomous driving controller 100 may detect the autonomous driving-related critical situation when the system deviates from a predefined operation region (or a predefined operational design region). For example, the autonomous driving controller 100 may determine, as the autonomous driving-related critical situation, a situation in which a high risk of accidents such as vehicle collision due to sudden deceleration of a front vehicle, interruption of another vehicle, and sudden lane change of a front vehicle occurs. Alternatively, the autonomous driving controller 100 may determine, as the autonomous driving-related critical situation, a situation in which vehicle control is desired to switch from the system to a human driver. However, the present disclosure is not limited thereto.

When the autonomous driving controller 100 detects the autonomous driving-related critical situation, the autonomous driving controller 100 may output the control-right handover requesting message and may start the first and second timers (S420). In this connection, the control-right handover requesting message may be a message requesting a control-right handover from the system to the human driver, and may be output through predetermined output means provided in the vehicle, for example, image output means such as a display, sound output means such as a speaker and a beeper, haptic means such as a vibration motor. However, the present disclosure is not limited thereto.

The autonomous driving controller 100 may determine whether the control-right handover has been completed before the first timer expires (S430).

When the control-right handover from the system to the human driver has been normally completed before the first timer expires, the autonomous driving controller 100 may convert the autonomous driving function to the deactivated state (S435).

When, based on the result of the determination at 430, the first timer has expired, the autonomous driving controller 100 may activate the minimal risk maneuver (MRM) mode (S440).

The autonomous driving controller 100 may continuously maintain the outputting state of the control-right handover requesting message even after the activation of the minimal risk maneuver (MRM) mode.

The autonomous driving controller 100 may determine whether the control-right handover has been completed before the second timer expires (S450).

When the control-right handover from the system to the human driver has been normally completed before the second timer expires, the autonomous driving controller 100 may convert the autonomous driving function to the deactivated state (S435).

When based on the result of the determination at 450, the second timer has expired, the autonomous driving controller 100 may output a message that the autonomous driving cannot be activated, and may send the driver assisting system deactivation requesting signal to the driver assisting system controller 40 through the vehicle internal communication network 20 (S460).

Subsequently, the autonomous driving controller 100 may transition the autonomous driving function from an activated state to a deactivated state (S470).

In this connection, the autonomous driving function deactivated state means a state in which activation of the autonomous driving function is not possible.

The autonomous driving controller 100 may determine whether the engine of the autonomous vehicle is restarted in a state in which the autonomous driving function is in the deactivated state (S480). In this connection, the autonomous driving controller 100 may determine whether the engine of the vehicle is restarted based on an external control signal.

When the engine-restart is detected, the autonomous driving controller 100 may deactivate the disallowed state of the use of the autonomous driving function (S490). Thus, the autonomous driving controller 100 may activate an autonomous driving function according to an external input, for example, when the human driver presses an autonomous driving function activation button when the disallowed state of the use of the autonomous driving function is deactivated.

In the form of FIG. 4, when the autonomous vehicle encounters the autonomous driving-related critical situation, the autonomous driving controller 100 may deactivate acceleration.

In the form of FIG. 4, when the autonomous vehicle operates in the minimal risk maneuver (MRM) mode, the autonomous driving controller 100 may allow the vehicle to be maintained in a current lane and may control the speed controller for deceleration. For example, the autonomous driving controller 100 may perform the deceleration control so that the vehicle stops within a predetermined time after the activation of the minimal risk maneuver (MRM) mode.

In the form of FIG. 4, when the autonomous vehicle operates in the minimal risk maneuver (MRM) mode, a sudden deceleration situation of a front vehicle, an interruption situation of another vehicle, or sudden appearance of an obstacle after sudden lane change of a front vehicle, etc. may be detected. However, when a lead time to cope with this situation is insufficient upon the detection thereof, emergency manipulation may be initiated for preventing collisions or alleviating an impact from the collision. In this connection, the emergency manipulation may include emergency braking manipulation, lane change manipulation, and the like. However, the present disclosure is not limited thereto. In this connection, the emergency manipulation may be automatically terminated when the human driver receives the control-right handover or the danger of the collision disappears.

Figure 5:
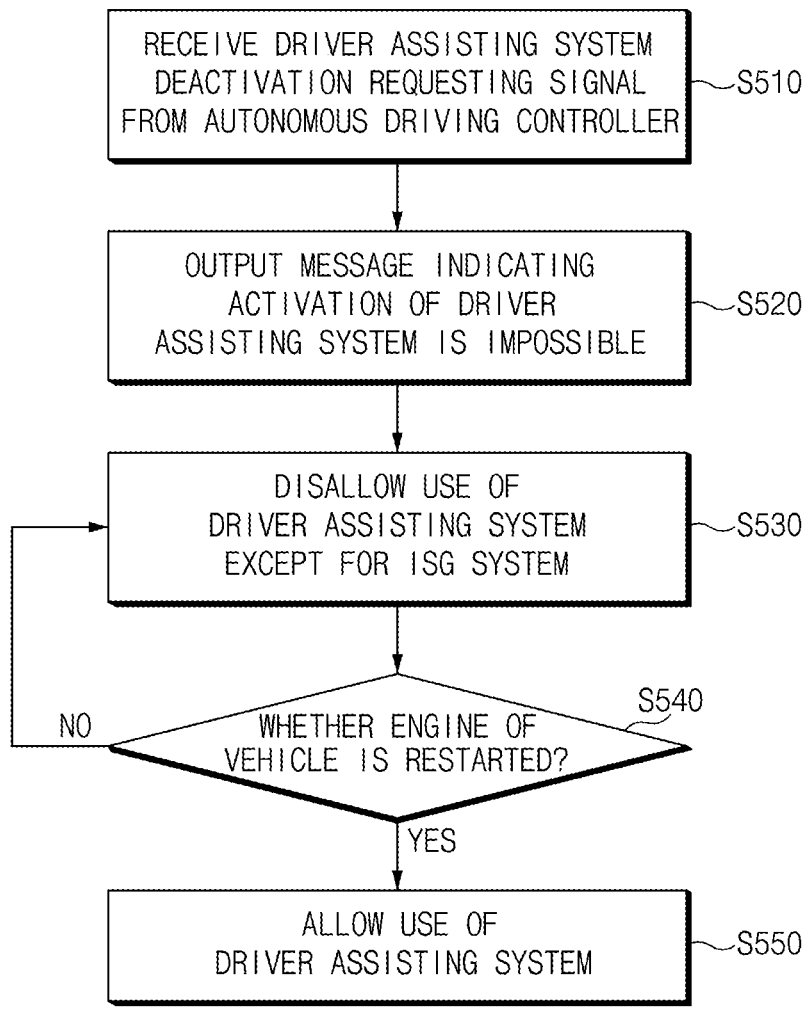
FIG. 5 is a flowchart for illustrating an autonomous vehicle control method according to another form of the present disclosure.

FIG. 5 is a flowchart for illustrating an autonomous vehicle control method according to another form of the present disclosure.

In detail, FIG. 5 is a flowchart for illustrating an autonomous vehicle control method upon the activation of the minimal risk maneuver mode by a combination of the autonomous driving controller 100 and the driver assisting system controller 40.

Referring to FIG. 5, the driver assisting system controller 40 may receive a driver assisting system deactivation requesting signal from the autonomous driving controller 100 (S510).

The driver assisting system controller 40 may output a message indicating that activation of the driver assisting system is impossible, through the output means provided in the vehicle (S520).

The driver assisting system controller 40 may disallow use of the driver assisting system except for the ISG system (S530).

The driver assisting system controller 40 may determine whether the engine of the vehicle is restarted in a state in which the driver assisting system is deactivated (S540).

In this connection, the driver assisting system controller 40 may detect whether the vehicle engine is restarted according to a control signal received from an external device, for example, an engine system controller, a start-up related controller, and the like.

When the engine-restart is detected, the driver assisting system controller 40 may allow the use of the driver assisting system (S550).

In the form of FIG. 5, the driver assisting system may include a smart cruise control (SCC) function to maintain a set speed at a predetermined driving speed or higher, a lane following assist (LFA) function to allow the vehicle to travel along a center of a lane or follow a front vehicle at a low speed section, a downtown section, a congested section, etc. using lane and road boundary information recognized through a front camera, a highway driving assist (HAD) function to more precisely match a degree of steering with a curve degree of a curved load using navigation information on a highway with reference to navigation data, and a lane keeping assist (LKA) function to allow the vehicle to maintain a lane as recognized via the front camera when driving at an average speed of 60 km/h or higher or 70 km/h per hour or higher. However, the present disclosure is not limited thereto.

The operations of the method or the algorithm described in connection with the forms disclosed herein may be embodied directly in a hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, a CD-ROM.

The exemplary storage medium is coupled to the processor which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The present disclosure has an advantage of providing the autonomous driving control method and the autonomous driving control method device.

In addition, the present disclosure has an advantage of providing a method and a device for controlling autonomous driving when the autonomous vehicle operates in the minimal risk maneuver (MRM) driving mode upon the critical situation detection.

In addition, the present disclosure has an advantage of providing a safer and more convenient autonomous driving system.

In addition, various effects that may be directly or indirectly identified based on the disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A method for controlling autonomous driving in an autonomous vehicle, the method comprising:
    detecting, by a critical situation detection device, an autonomous driving-related critical situation during the autonomous driving;
    outputting, by a control-right handover request device, a notification message requesting a control-right handover from an autonomous driving system to a human driver when the autonomous driving-related critical situation is detected;
    operating a first timer and a second timer when the autonomous driving-related critical situation is detected;
    when the control-right handover is not successful, activating, by a minimal risk maneuver (MRM) determination device, a MRM driving mode in which an operation of the autonomous driving system is disallowed,
    wherein the disallowed state of the autonomous driving system in the MRM driving mode is maintained until an engine-restart of the autonomous vehicle is detected; and
    deactivating, when the engine-restart is detected, the disallowed state of the autonomous driving system such that the operation of the autonomous driving system is allowed,
    wherein:
        an operation time of the second timer is longer than an operation time of the first timer,
        acceleration of the autonomous vehicle is deactivated during the operation time of the first timer,
        when the first timer expires, the MRM driving mode is activated and a deceleration control is carried out until the autonomous vehicle is stopped,
        when the second timer expires, a driver assisting function is deactivated until the engine-restart is detected,
        when the driver assisting function is deactivated, an Idle Stop and Go (ISG) function is available, and
        a current driving lane of the autonomous vehicle is maintained during the deceleration control.

2. The method of claim 1,
    wherein the driver assisting function includes at least one of a smart cruise control (SCC) function, a lane following assist (LFA) function, a highway driving assist (HDA) function, or a lane keeping assist (LKA) function.

3. The method of claim 1, wherein when the control-right handover from the autonomous driving system to the human driver has been completed before at least one of the first timer or the second timer expires, the outputting of the notification message is stopped, and the operation of the autonomous driving system is disallowed.

4. The method of claim 1, wherein after the MRM driving mode is activated, the outputting state of the notification message is maintained until the control-right handover has been completed.

5. The method of claim 1, wherein the autonomous driving-related critical situation includes a situation in which the autonomous driving system deviates from a predefined operation region such that a normal operation of the autonomous driving system is impossible.

6. An autonomous driving controller comprising:
    a processor; and
    a non-transitory storage medium having a program executed by the processor to cause the autonomous driving controller to:
    detect an autonomous driving-related critical situation during autonomous driving;
    output a notification message requesting a control-right handover from an autonomous driving system to a human driver when the autonomous driving-related critical situation is detected;
    operate a first timer and a second timer when the autonomous driving-related critical situation is detected, wherein an operation time of the second timer is longer than an operation time of the first timer;
    control a speed of the autonomous vehicle;
    deactivate acceleration of the autonomous vehicle during the operation time of the first timer;
    determine whether to activate a minimal risk maneuver (MRM) driving mode, based on whether the control-right handover is successful;
    when the control-right handover is not successful, activate the MRM driving mode in which an operation of the autonomous driving system is disallowed;
    maintain the disallowed state of the autonomous driving system in the MRM driving mode until an engine-restart of an autonomous vehicle is detected;
    when the engine-restart is detected, deactivate the disallowed state of the autonomous driving system such that the operation of the autonomous driving system is allowed;
    when the first timer expires, and thus the MRM driving mode is activated, perform a deceleration control until the autonomous vehicle is stopped;
    when the second timer expires, send a predefined control signal to a driver assisting system controller to deactivate a driver assisting function until the engine-restart is detected, wherein when the driver assisting function is deactivated, an Idle Stop and Go function (ISG) is available; and
    maintain a current driving lane of the autonomous vehicle during the deceleration control.

7. The autonomous driving controller of claim 6,
    wherein the driver assisting function includes at least one of a smart cruise control (SCC) function, a lane following assist (LFA) function, a highway driving assist (HDA) function, or a lane keeping assist (LKA) function.

8. The autonomous driving controller of claim 6, wherein when the control-right handover from the autonomous driving system to the human driver has been completed before at least one of the first timer or the second timer expires, the program executed by the processor causes the autonomous driving controller to stop the outputting of the notification message and deactivate the autonomous driving system.

9. The autonomous driving controller of claim 6, wherein after the MRM driving mode is activated, the program executed by the processor causes the autonomous driving controller to maintain the outputting state of the notification message until the control-right handover has been completed.

10. The autonomous driving controller of claim 6, wherein the autonomous driving-related critical situation includes a situation in which the autonomous driving system deviates from a predefined operation region such that a normal operation of the autonomous driving system is impossible.

* * * * *